(12) United States Patent
Tibbitt et al.

(10) Patent No.: US 6,863,988 B2
(45) Date of Patent: Mar. 8, 2005

(54) OXYGEN SCAVENGING MONOLAYER BOTTLES

(75) Inventors: James M. Tibbitt, Wheaton, IL (US); Paul J. Cahill, Wheaton, IL (US); George E. Rotter, Naperville, IL (US); David P. Sinclair, Winfield, IL (US); Gary T. Brooks, Naperville, IL (US); Raymond T. Behrends, Lombard, IL (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 10/028,167

(22) Filed: Oct. 25, 2001

(65) Prior Publication Data

US 2002/0183448 A1 Dec. 5, 2002

Related U.S. Application Data

(63) Continuation-in-part of application No. 09/219,178, filed on Dec. 22, 1998, now Pat. No. 6,406,766, which is a continuation-in-part of application No. 08/717,370, filed on Sep. 23, 1996, now Pat. No. 6,083,585, and a continuation-in-part of application No. PCT/US98/05239, filed on Mar. 17, 1998, now Pat. No. 6,346,308, and a continuation-in-part of application No. PCT/US98/02991, filed on Feb. 17, 1998, now Pat. No. 6,506,463, and a continuation-in-part of application No. PCT/US97/16712, filed on Sep. 22, 1997, now Pat. No. 6,365,247.

(60) Provisional application No. 60/243,504, filed on Oct. 26, 2000.

(51) Int. Cl.$^7$ .......................... B32B 27/18; B32B 27/36
(52) U.S. Cl. .................. 428/480; 428/35.5; 428/35.7; 428/36.6; 428/36.92; 252/188.1; 252/188.28; 528/298; 528/308; 528/308.6; 524/779; 524/780; 524/781; 524/783; 524/785; 525/437; 525/444; 525/445
(58) Field of Search ........................... 428/480, 35.5, 428/35.7, 36.6, 36.92; 252/188.1, 188.28; 528/298, 308, 308.6; 524/779, 780, 781, 783, 785; 525/437, 444, 445

(56) References Cited

U.S. PATENT DOCUMENTS

| | | | |
|---|---|---|---|
| 5,021,515 A | 6/1991 | Cochran et al. | 525/371 |
| 5,049,624 A | 9/1991 | Adams et al. | 525/371 |
| 5,077,111 A | 12/1991 | Collette et al. | 428/36.7 |
| 5,211,875 A | 5/1993 | Speer et al. | 252/188.28 |
| 5,298,849 A | 3/1994 | Drexel et al. | 320/2 |
| 5,310,497 A | 5/1994 | Ve Speer et al. | 252/188.28 |
| 5,346,644 A | 9/1994 | Speer et al. | 252/188.28 |
| 5,350,622 A | 9/1994 | Speer et al. | 428/215 |
| 5,399,289 A | 3/1995 | Speer et al. | 252/188.28 |
| 5,529,833 A | 6/1996 | Speer et al. | 428/215 |
| 5,639,815 A | 6/1997 | Cochran et al. | 524/413 |
| 5,700,554 A | 12/1997 | Speer et al. | 428/220 |
| 5,834,079 A | 11/1998 | Blinka et al. | 428/35.7 |
| 5,952,066 A * | 9/1999 | Schmidt et al. | 428/35.9 |
| 5,955,527 A | 9/1999 | Cochran et al. | 524/413 |
| 6,083,585 A * | 7/2000 | Cahill et al. | 428/35.7 |
| 6,254,804 B1 * | 7/2001 | Matthews et al. | 252/188.28 |
| 6,346,308 B1 * | 2/2002 | Cahill et al. | 428/35.7 |
| 6,365,247 B1 * | 4/2002 | Cahill et al. | 428/35.7 |
| 6,406,766 B1 * | 6/2002 | Rotter et al. | 428/35.7 |
| 6,454,965 B1 * | 9/2002 | Ching et al. | 252/188.28 |

FOREIGN PATENT DOCUMENTS

| | | | |
|---|---|---|---|
| EP | 0 380 830 | * | 8/1990 |
| WO | 9812244 | | 3/1998 |

OTHER PUBLICATIONS

Slides from Presentation by Marianne Heinrich and Gregory Schmidt—PET '99—Zurich, Oct. 25, 1999.

* cited by examiner

*Primary Examiner*—Vivian Chen
(74) *Attorney, Agent, or Firm*—Jennifer M. Hall

(57) ABSTRACT

Monolayer packages comprised of an oxygen scavenging composition suitable for direct contact with package contents and recycle with other polyester bottles are disclosed. The oxygen scavenging composition is comprised of a modified copolymer which is comprised of predominantly polyester segments and an oxygen scavenging amount of oxygen scavenging segments. The polyester segments comprise segments derived from typical bottling and packaging polyesters such as PET and PEN. Use of these oxygen scavenging copolymers in bottles provides a clear and rigid monolayer bottle similar in appearance to unmodified polyester bottles. In a series of preferred embodiments, bottles fabricated with the oxygen scavenging copolymers of this invention are over 99 wt % PET and contain less than 50 ppb of extractable components.

37 Claims, No Drawings

OXYGEN SCAVENGING MONOLAYER BOTTLES

RELATIONSHIP TO PRIOR APPLICATIONS

In the United States, the application claims the benefit of U.S. Provisional Application Ser. No. 60/243,504 filed Oct. 26, 2000 and is a continuation-in-part of application Ser. No. 09/219,178, filed on Dec. 22, 1998, now U.S. Pat. No. 6,406,766 which is a continuation-in-part of application Ser. No. 08/717,370, filed on Sep. 23, 1996, now U.S. Pat. No. 6,083,585; and a continuation-in-part of application no. PCT/US98/05239, filed on Mar. 17, 1998, now U.S. Pat. No. 6,346,308, and a continuation-in-part of application no. PCT/US98/02991, filed on Feb. 17, 1998, now U.S. Pat. No. 6,506,463, and a continuation-in-part of application no. PCT/US97/16712, filed on Sep. 22, 1997, now U.S. Pat. No. 6,365,247.

FIELD OF THE INVENTION

The present invention relates to containers for packaging oxygen-sensitive substances, especially foods and beverages. The invention is more particularly directed to monolayer packages comprised of oxygen barrier materials of the so-called active oxygen scavenger type.

BACKGROUND OF THE INVENTION

Plastic packaging materials continue to gain acceptance by the packaging industry because they are tough, lightweight, and easily fabricated into containers. The deployment of plastic materials into films, trays, bottles, cups, bowls, coatings and liners is already commonplace. Although plastic materials such as polyethylene terephthalate (PET) and polyethylene naphthlate (PEN) offer the packaging industry many benefits with broad design flexibility, the utility of plastic materials is often limited in situations where preventing ingress of atmospheric gases (primarily oxygen) is necessary to assure adequate product shelf life. When compared to traditional packaging materials such as glass and steel, plastics often offer inferior barrier properties which limits their acceptability for use in packaging items that are sensitive to atmospheric gases, such as beer and fruit juices, particularly when the exposure to the atmospheric gases could result in spoilage. The packaging industry continues to seek packaging materials for use with oxygen sensitive products that offer the design flexibility of plastics with the inherent recycle advantage of plastics and at the same time have the barrier properties of glass and steel.

The use of multilayer bottles that contain core layers of an oxygen scavenging material is commonplace. Typically, the center layer is a blend of inorganic, or organic polymeric, oxygen scavenging material. Multilayer oxygen scavenging packages and walls for a package are disclosed in U.S. Pat. Nos. 5,021,515, 5,639,815 and 5,955,527 to Cochran. The multilayer packages of Cochran comprise inner and outer layers of a non-oxidizable polymer and a core layer that consists of an oxidizable polymer and a catalyst or polymer blends containing an oxidizable polymer and a catalyst. The oxidizable polymer is a polyamide such as MXD-6 nylon. Although oxidizable polymers such as MXD-6 could be used as a single layer package wall, Cochran teaches that the oxidizable polymer is preferably protected from undesired direct contact with the package contents and the environment by the inner and outer layers.

Blends of PET and MXD-6 in multilayer applications are also disclosed in U.S. Pat. No. 5,077,111 to Collette. Collette discloses a five layer preform wherein the inner, outer and core layer are formed of PET and the inner and outer intermediate layers are formed from a blend of PET and MXD-6. Similar to the bottles disclosed in Cochran, the oxidizable polymer, MXD-6, comprises the core layer and is encapsulated by PET in the multilayer container of Collette. This is because direct contact with the package contents may cause difficulties such as undesirable chemical reactions between the oxygen scavenger and the package contents or leaching of oxygen scavenger components or oxidation by-products into the package contents.

The multilayer containers of the prior art have several drawbacks. First, due to the dissimilar nature of the materials in the core and outer layers, they are not readily recyclable. Recycling for multilayer containers often requires separation of the barrier layer (nylon or EVOH) from the main portion of the recycling stream. Such separation is often incomplete and thus the barrier resin contaminates the recycle stream.

Second, it is both more difficult and more expensive to manufacture multilayer containers. Currently, there are few organizations that are capable of producing good quality multilayer barrier preforms. The difficulty is often achieving a uniform layer of barrier material since it may constitute as little as 4% of the total bottle weight. The barrier material must uniformly cover the total bottle surface in order to be effective. Any non-uniformity of the core layers leaves pathways through which oxygen may more readily permeate. It is recognized, however, that some multilayer fabricators may intentionally inject the scavenger at variable thicknesses throughout the part to increase the relative scavenger concentration in the thinnest areas of the final part. Third, to prevent contacting the food and beverage with the core layer material which may not be suitable for direct food contact, fabricators must precisely control placement of this material so that the food contact surface is pure PET. In order to do this molders must start and finish each molding cycle with pure PET. This leaves areas of the preform without coverage at the base and finish of the bottle through which oxygen can enter the container Fourth, multilayer injection molding equipment is more difficult to operate, more expensive to purchase and maintain and is not as prevalent in the bottling industry as monolayer equipment which is currently used, for example, in soft drink applications.

Fifth, because the multilayer barrier bottles are made from dissimilar materials the interface between the materials is weak and the bottles often delaminate in use or when stressed during filling. This results in a wall that appears to be fractured. This is common with multilayer bottles that have an EVOH or an MXD6 nylon scavenger inner layer with outer layers of PET. Sixth, industrial scrap made from the multilayer bottle process cannot be directly ground up and re-used in the process for the same reasons that they are less desirable in the recycle stream. Finally, multilayer containers work against an oxygen scavenger's ability to eliminate headspace oxygen since the scavenging layer and the headspace are separated by the inert inner-most layer of the multilayer container which reduces the scavenger's effectiveness.

Monolayer packages of the prior art have drawbacks as well. The Collette '111 patent teaches monolayer blends of PET and MXD-6. But as discussed above, direct contact between the package wall and the package contents may cause undesirable migration of the oxygen scavenger or its by-products from the package wall into the package contents. This effects the taste of the contents and the appropriateness of the package for direct food contact applications. In addition, these blends require a minimum of 4% MXD-6 which leads to a loss of clarity (haze) in the final package because the two polymers are incompatible and phase separate. Because of the mixture of dissimilar materials, the PET/MXD-6 monolayer containers are not suitable for direct recycling and must be segregated and landfilled.

Thus, there is a need for an oxygen scavenging container that is readily recyclable, has substantially uniform distribution of the oxygen scavenger throughout the package wall, can be manufactured on conventional molding equipment, is not prone to delamination when stressed and has a low level of extractable components. A monolayer package comprised primarily of polyester yet possessing oxygen scavenging ability can satisfy this need.

One method proposed for providing oxygen scavenging ability to polyester is the incorporation of oxygen scavenging species into the polyester. Such incorporation would result in a modified polyester with enhanced oxygen barrier properties that could be formulated to meet the particular needs of the packaged product by varying the level of oxygen scavenging substance incorporated into the polyester. Naturally, increasing the oxygen barrier properties of packaging polyesters such as PET must be done without sacrificing the salient features and properties of PET. For the purposes of this invention, the salient features and benefits of PET include (1) transparency, (2) rigidity, (3) good passive barrier properties, (4) recycle capability, (5) processability, (6) reasonable cost, (7) a long history of use by the plastic packaging industry, and (8) does not adulterate the package contents. Thus, there are at least two separate considerations involved in development of materials and methods that could be used to improve the oxygen scavenging properties of PET. First, it is necessary to identify species which are readily oxidizable and possess high oxygen scavenging capacity so that their amount can be minimized. Logic dictates that use of the smallest amount of material should have the least impact on the other salient features of polyester packages as well as the lowest amount of extractable by-products. However, other considerations must be made in addition to oxygen scavenging capacity including such factors as cost, clarity, processability, recycling, etc. Second, it is necessary to devise a means for permanently incorporating the more promising scavenging species into the packaging and bottling polyesters to form desirable oxygen scavengers.

Applicants were able, to satisfy both of these considerations by developing novel modified copolymer compositions comprising predominantly polycondensate segments and a lesser weight percentage of oxygen scavenging moiety (OSM) segments. These oxygen scavenging compositions can be incorporated directly into a monolayer container wall that has all the salient features of PET as well as the ability to scavenge both headspace oxygen and oxygen permeating through the container wall.

SUMMARY OF INVENTION

The present invention provides a monolayer package characterized in that it satisfies other features required of the polyester package while providing oxygen scavenging capabilities.

One aspect of the invention is that the oxygen scavenging packaging article is suitable for recycle with conventional polyester bottles. This includes use of scrap that is generated during oxygen scavenging bottle fabrication and post-consumer scrap in the form of oxygen scavenging bottles. Another aspect is that the oxygen scavenging packaging article comprising the oxygen scavenging composition is appropriate for direct contact with the package contents. A third aspect of the invention is that the oxygen scavenging composition becomes an integral part of the packaging article during fabrication, use and recycle. In other words, it does not delaminate or separate from the packaging polyester.

Applicants' unique oxygen scavenging composition is comprised of a modified copolymer comprised of predominantly polycondensate segments containing a lesser weight percentage of oxygen scavenging moiety segments. The oxygen scavenging moiety segments need only be present in an amount necessary to provide the degree of oxygen scavenging capacity needed for the particular application. These segments are typically incorporated into the modified copolymer in the range of 0.05 wt % to about 20 wt % based on total weight. The modified copolymer may be used alone, but is typically blended with unmodified PET packaging resins to form a monolayer container. The final container will typically have from about 90–99.8 wt % unmodified polyester and from about 0.02 to 10 wt % modified copolymer. Since the novel modified copolymers are comprised largely of polyester segments, packaging articles constructed from the modified copolymer and unmodified PET are comprised primarily of polyester and are thus suitable for recycle with conventional polyester bottles from other sources with no need for special processing or separation.

Because applicants' packaging articles are a single layer comprised of unmodified PET and modified copolymer, they may be manufactured on standard monolayer molding equipment. The ability to manufacture on monolayer equipment provides many advantages including lower capital costs, lower manufacturing costs as well as recyclablity into the current scrap PET recycle stream. Moreover, unlike multilayer injection molding equipment, monolayer injection molding equipment produces a bottle with the oxygen scavenging composition well-dispersed throughout the package wall that does not delaminate or separate from the PET.

The present invention may be manufactured as a monolayer package because the oxygen scavenging composition, when incorporated into the package wall, is appropriate for direct contact with the package contents. It is important to note for the rest of the specification and claims that "appropriate for direct contact" means that direct contact with the package contents does not adulterate the package contents. This can be caused by chemical reactions between the package contents and the package wall, loss of flavor to the package wall (also known as scalping of the package contents) or significant migration of the components of the package wall into the package contents. In other words, any chemical reactions, scalping of the package contents or migration that may occur does not have an impact on the package contents that is detectable by the consumer, or effect the appropriateness of the package for direct food contact in accordance with FDA regulations.

"Monolayer Package" means that the package or package preform is fabricated on standard monolayer molding equipment such as injection blow molding equipment, extrusion blow molding equipment or other molding methods recognized by those skilled in the art as a means for manufacturing monolayer containers. However, coatings applied to a preform or a finished container fabricated on monolayer equipment is not precluded from the scope of the present invention.

DETAILED DESCRIPTION OF THE INVENTION

Applicants were able to solve many of the problems associated with use of plastic containers for oxygen sensitive foods by developing novel oxygen scavenging compositions comprising a modified copolymer comprised of predominantly polycondensate segments and a lesser weight percentage of oxygen scavenging (OS) segments. Said oxygen scavenging compositions were designed to be compatible with packaging resins so that they could be diluted in standard packaging resins, thus minimizing cost. It is common practice to use copolymers, more specifically copolycondensates, as packaging and bottling materials. For example, even common polyethylene terephthalate (PET) bottles used for bottling soft drinks often comprise isophthalic linkages in the polymer and thus could be called a copolymer. In order to avoid such ambiguities, the term oxygen scavenging copolymer or modified copolymer will be used to designate those polymers which have oxygen scavenging moiety (OSM) segments, and unmodified PET is defined as a homopolymer or copolymer that is devoid of OSM segments.

The OSM segments need be present only in an amount necessary to impart the degree of oxygen scavenging capacity needed for the particular application and are preferably comprised of polyolefin oligomer segments which have been incorporated into the modified copolymer. However, other oxygen scavenging moiety segments such as polypropylene oxide oligomers, methyl pendant aromatic compounds or others that one skilled in the art may readily determine, may be used in accordance with this invention. For this invention, predominantly polyester segments is defined as at least 80 wt % base polyester segments based on the weight of the copolymer. Since the modified copolymers comprise mainly polyester segments, such as PET segments, the properties of the modified copolymers formed remain very similar to those of the base polyester, i.e., the unmodified polyester lacking the OSM segments. In addition, the preferred modified copolymer remains an integral part of the packaging article due to the compatibility of the modified copolymer with PET. In fact, it is likely that the modified copolymer undergoes transesterification with the unmodified PET during the bottle fabrication process. This creates a package in which the oxygen scavenging copolymer and the unmodified PET cannot be physically separated. Because it does not physically separate, there is no delamination or separation between incompatible segments or components of the bottle.

The oxygen scavenging ability of these modified copolymers is present at temperatures both above and below their glass transitions temperature ($T_g$). The $T_g$'s of the modified copolymers that are incorporated into the packages of this invention are typically above 62° C. which means the copolymers can be made into or incorporated into packaging articles that have commercial oxygen scavenging capacity at ambient temperatures in the range of about 0° C. to about 60° C. In addition, since the novel modified copolymers are comprised largely of polyester segments, bottles constructed comprising the modified copolymers are suitable for recycle with conventional polyester bottles from other sources and with no need for special processing.

The polyesters, including PET, used for fabrication of plastic bottles and other packaging articles can be the same polyesters from which the polyester segments are derived in the modified copolymers of this invention. Polyesters suitable for use in this invention are widely available for purchase. Examples of polyesters that can be employed in the present invention include polyethylene terephthalate, polyethylene naphthalate, isophthalic copolymers of PET and mixtures of the foregoing. Specific examples of commercially available polyester resins useful in the present invention are M&G Shell PET resins 7207 and 9506 ("C-PET"), Teijin Limited PET resins TR8580, Eastman Kodak PET resin 9902 and Kosa 1101, 4401 and T94. Preferably, PTA based PET resins, such as Kosa 1101 and M&G Shell 8416 are used. In selected embodiments, the present invention also contemplates the use of recycle PET as part of the feed wherein said recycle PET may already contain low levels of branching agent or other additives originally formulated therein.

As previously stated, the OSM segments only need to be present in the modified copolymer of the present invention to the extent necessary to impart the desired oxygen scavenging capacity. One reason for keeping the OSM segments only at the level required is to satisfy the objective of keeping the modified copolymer as similar as possible to the polyester homopolymer. This provides benefits in manufacturing, recycling and in minimizing cost and extractable by-products. In practice, when diluting the modified copolymer with unmodified PET, it has been found that the presence of OSM segments in the range of about 0.05 wt % to about 20 wt % based on weight of the modified copolymer is a useful weight percent range. The preferred range is 2 to about 15 wt % OSM segments and most preferred is 5 wt % to 10 wt % OSM segments based on weight of the modified copolymer.

At this point, it is important to note that the weight percent of the OSM segments is that which is found in the modified copolymer and not that which is found in the final packaging article. When manufacturing the final packaging article, the modified copolymer is typically blended with an unmodified polyester such as PET to produce a container having from about 90 to 99.8 wt % unmodified polyester and from about 0.02 to 10 wt % modified copolymer, preferably 1–10 wt % modified copolymer, and more preferably 2–6 wt % modified copolymer. This means that the final oxygen scavenging container contains from about 0.001 wt %–2 wt % OSM segments.

The OSM segments of the oxygen scavenging copolymers are at least singly functionally terminated with a group capable of entering into polycondensation polymerization and/or capable of reaction with previously formed polyester moieties to form new covalent bonds. Alternately, these OSM segments can react with the polymer end groups to provide a copolymer structure. A functionally terminated OSM may be represented by Formula 1.

X-(OSM)-Y            Formula 1

Double functionality is shown in Formula 1 as one possibility but the OSM may be singly functionally terminated or functionalized to a degree greater than two. Those of ordinary skill in the art will recognize that the commercial availability of functionally terminated OSM species will obviate the need to add such functionalization. An essential feature of the OSM of Formula 1 is that it is readily oxidizable at ambient temperature, and this auto-oxidation does not result in the generation of significant volatile or extractable by-products. Preferred OSM's include polyolefin oligomers of molecular weight 100 to 10,000, polypropylene oxide oligomers, or methyl pendant aromatic compounds as defined in U.S. application Ser. No. 09/485,517. Applicants have found that the polybutadiene moiety, when incorporated as segments in a modified copolymer, serves as a suitable OSM. However, especially preferred is the unhydrogenated polybutadiene oligomer of MW 1000–3,000. In Formula 1, X and Y are typically the same and may be any species capable of entering into polycondensation and/or transesterification. A non-limiting list of possible species represented by X or Y includes OH, COOH, $NH_2$, epoxides, and substituted derivatives thereof capable of entering into step-growth, condensation and/or transesterification reactions.

Applicants have discovered that inclusion of low levels of chain extending or crosslinking agents in the process serves to prevent molecular weight degradation thus increasing polymer melt viscosity, and maintaining the glass transition temperature of these oxygen scavenging copolymers. Higher glass transition temperatures are of significance because the modified copolymers exist as solids below the glass transition temperature and can be formed into films and other packaging articles which retain their shape and mechanical integrity at near ambient temperatures (i.e., about −20−+60° C.). The modified copolymers of this invention are able to scavenge oxygen at temperatures both above and below their glass transition temperature. Applicants' preferred chain extending agent is pyromellitic dianhydride (PMDA) because it is commercially available, it reacts quickly and substantially to completion, and because PMDA-modified PET is listed and approved by the United States Food and Drug Administration. The PMDA, when employed, is used in the range of about 0.1 to about 3 wt % with respect to the weight of the modified copolymer. Optionally, a transition metal catalyst may be added to the copolymer during manufacture. The presence of such a catalyst when employed in the range of about 10 ppm to about 5000 ppm serves to facilitate both the incorporation of the OSM into the polymer and the rate of oxygen uptake. The preferred catalysts are Group VIII multivalent transition metals ions such as iron, cobalt, and nickel. Ionic cobalt is especially preferred because it also facilitates the transesterification process.

The modified copolymers may be prepared by known batch or continuous processes. Those of ordinary skill in the art will recognize that the terminal functionality of the OSM need not be identical to the functionality of the replaced monomer so long as reactive incorporation proceeds. For example, in the production of PET, terephthalic acid is copolymerized with ethylene glycol. In such instance, substitution of the desired molar equivalent amount of the dihydroxy terminated species of Formula 1 (i.e., substitution for an equivalent molar amount of ethylene glycol) in the polycondensation reaction would result in a modified polyester having some OSM segments in the copolymer at the expense of fewer ethylene segments. Applicants' preferred method for preparation of the oxygen scavenging copolymers is by reactive extrusion since it allows for greater flexibility at later stages in the overall scheme of production of oxygen scavenging bottles and packaging articles. Preparation of the copolymers of this invention by reactive extrusion is disclosed in detail in U.S. Pat. No. 6,083,585 to Cahill which is hereby incorporated by reference.

In an especially preferred embodiment, applicants produce an oxygen scavenging modified copolymer by reactive extrusion of a mixture comprising about 90 wt % PET (or PET copolymer containing naphthalate, isophthalate, etc.) and about 10 wt % unhydrogenated hydroxyl-terminated polybutadiene oligomer. The molecular weight of the hydroxyl-terminated oligomer is in the range of 100 to 10,000. PMDA is added to this reaction mixture in the range of about 0.5–2.0 wt %, preferably 0.75–1.5 wt %. A transition metal salt, 50–2,000 ppm (preferably about 500–1500) PPM of a transition metal (preferably cobalt) and 0–300 PPM benzophenone is added to the copolymer. A rather specific embodiment of the oxygen scavenging composition formulation comprising about 88 wt % PET segments, about 10 wt % polybutadiene segments, 0.5–2.0 wt % PMDA, 500–1500 PPM transition metal catalyst, and 100–300 PPM benzophenone, will subsequently be referred to as oxygen scavenging concentrate (OS concentrate) in this application for the sake of convenience.

This OS concentrate is designed to be melt blended with packaging resins such as PET for use in monolayer packages. It is also suitable for blending into specific layers of multilayer containers. Processing conditions for fabricating bottles or containers (e.g. barrel temperatures, injection speeds, cycle times) are similar to those used for pure PET of similar inherent viscosity on the same equipment. Blending may be accomplished by dosing the OS concentrate much as one skilled in the art would use a solid color concentrate. It is recommended that OS concentrate be metered into the dried PET stream just above the extruder feed throat using a dosing feeder which is kept blanketed with dry nitrogen. If dosing equipment is unavailable, OS concentrate may be pre-blended (masterbatched) with dry PET. Such blends should not be re-dried in air prior to preform fabrication and should be stored under dry nitrogen. The packaging articles of the present invention are manufactured from the molten blend of OS concentrate and polyester resins such as PET or PET copolymers having some naphthalate, isophthalate, etc. This blend is molded into the desired packaging article on any of several types of molding equipment.

One process for fabricating a bottle or container is injection stretch blow molding. Other methods include extrusion blow molding, rotational molding, compression molding, and thermoforming. Injection stretch blow molding is typically practiced in either a one or two step process. In the one step process, the injection and blow molding stages are combined in a single piece of equipment. The two step process uses separate machines to fabricate the preform and blow the bottle. To form the monolayer container of the present invention in the two step process, pellets of the chosen packaging polymer, such as PET, and the OS concentrate are mixed and heated in a chamber to a temperature at which flow will occur under shear. The molten polymer is then forced into a closed mold cavity under pressure where it is then allowed to cool and solidify. The cavity is then opened, the part removed, and the cycle repeated as needed to make additional parts. This molded part is commonly referred to as a preform.

To carry out the blow molding step, the preform is transferred to a second machine where internal gas pressure is used to expand the reheated preform against the surface of a larger mold. Such expansion is facilitated by applying the pressure after heating the preform above the glass transition temperature of the polymer such that it will more readily expand in response to the applied internal pressure. In the one step process, this condition may be obtained simply by applying internal pressure after injection molding but before the preform has cooled completely. In extrusion blow molding the intermediate part is a flexible tube of polymer commonly called a parison. Internal gas pressure is used to expand the parison against the mold surface where it cools and solidifies.

One method of blow molding bottles includes a heat setting step where the bottle is blown into a hot mold to enhance crystallization in the bottle wall or finish. The enhanced crystallinity improves passive barrier properties of the PET and provides resistance to deformation when the bottle is subsequently filled with a hot liquid. The rate of this step is limited by the crystallization rate of PET and it slows the production rate of PET bottles relative to non-heat set operations. The oxygen scavenging copolymer of the present invention crystallizes faster than PET. When it is blended with PET to form the monolayer bottles of the present invention, it accelerates the crystallization rate of PET and thus may lead to reduced cycle times for heat set operations.

Multilayer co-injection molding differs from monolayer injection molding in that multiple materials and layers are molded into a single preform part. Note these generally involve additional reservoirs of molten polymer resin beyond the reservoir necessary for monolayer molding. When manufacturing multilayer oxygen barrier containers, one of the additional reservoirs contains the oxygen scavenging or barrier material, such as activated polyamide MXD6 or EVOH, that makes up the core layer(s) of the container. These processes typically use a specially designed manifold to direct the various molten polymers into the various layers. Typically, packaging resin such as PET is forced into the mold from the first reservoir. The second material may flow sequentially or simultaneously with the first material. Sophisticated process control equipment is required to accomplish this stratification. Often in order to prevent the second material from reaching a food contact surface in the present or subsequent part, an additional amount of the first material is forced into the mold after flow from the second material has been halted. In the resultant part, the second material is thus fully encapsulated by the first material. This typically means that a portion of the preform will have no layer of barrier material existing between the interior and exterior surfaces of the part. These sections thus provide a weaker barrier if the second material is a higher barrier resin or an active oxygen scavenging resin. Thus, oxygen scavenging bottles molded on multi-layer equipment have areas in the finish, base and sometimes the body of the bottle which contain little or no scavenging material.

As has been indicated in several instances already, recycle of the bottles fabricated using the oxygen scavenging compositions of this disclosure is an important inventive aspect of this disclosure. Further, the fabricated bottles should be suitable for recycle with other polyester bottles without the need for any special processing such as delamination to separate the barrier layers or depolymerization to recover raw materials. A quick review of the materials present in the fabricated bottles of this invention shows how the recycle requirements have been met. For a typical individual serving juice bottle of approximately one half liter capacity, the OS concentrate represents about 1–5 wt % by weight of the entire bottle. The remaining 95–99% of the bottle is unmodified polyester, normally PET. Under the heavier loading conditions of the OS concentrate with about 15 wt % polyolefin oligomer, the modified copolymer is still 85% by weight PET segments and is typically 88–92% by weight PET when the more preferred percentages of polyolefin oligomer segments are employed. This means the final fabricated bottle is at least 99 weight percent PET and typically 99.75 weight percent PET. The high weight percentage of PET in the fabricated bottle renders it more suitable for recycle with other PET or polyester bottles. Furthermore, the modified copolymers of this invention are compatible with PET so that, when blended, the modified copolymer cannot be physically separated from the PET.

Low loading levels of the oxygen scavenging composition also provide an oxygen scavenging package with high clarity. As stated earlier, one of the salient features of PET packages is transparency or clarity. This feature is maintained in the present invention because the oxygen scavenging composition is compatible with PET and the low levels of OSMs in the final package. Depending on the end-use, acceptable haze values in the packaging industry are less than about 8%, preferably less than 5% and most preferably around 3% using ASTM standard D-1003 for measuring haze. Example III demonstrates that under commercial fabrication conditions, bottles comprised of OS concentrate and PET have haze values that are less than about 8%. Lower haze values can be achieved when the OS concentrate contains a lower weight percent of OSM segments in the modified copolymer or a lower weight percent of the OS concentrate in the final packaging article. In addition, lower haze values can be achieved when the OS concentrate is blended with isophthalic copolymers of PET.

The high weight percent of polyester in the package of the present invention, and the lack of detectable changes in the taste of the package contents, detrimental chemical reactions or notable leaching between the oxygen scavenging copolymer in the package wall and the package contents, renders it suitable for direct food contact monolayer applications. In the United States, plastics intended for food contact applications, such as packages or containers, are regulated by the Federal Food, Drug and Cosmetic Act. If a component of a package is reasonably expected to become a component of food (which includes foods, beverages, condiments and the like) it must be (a) the subject of a food additive regulation, an effective Food Contact Notification, or a Threshold or Regulation exemption, (b) the subject of a prior sanction or approval, or (c) deemed generally recognized as safe (GRAS) for the intended application. A substance is generally considered a food additive if properly conducted extraction studies simulating the intended conditions of use yield detectable migration of the test substance at an analytical sensitivity of 50 ppb. In other words the food must contain less than 50 ppb of the tested substance that has migrated from the package wall into the food. If a substance is not reasonably expected to become a component of food under the intended conditions of use, it is not a food additive by definition, and may be used without any prior approval by the FDA.

A packaging article manufactured using the oxygen scavenging composition of the present invention contains a variety of components that may migrate into the food or beverages contained in the packaging article. These substances, including benzophenone, ethyl hexanoate, pyromellitic acid and cobalt, are not detected at sensitivity levels significantly below 50 ppb when used under the intended conditions. Non-detection may be due to the low level of oxygen scavenging composition, or due to other reasons such as inability of the components to diffuse through PET. As the migration is not detected at levels well below 50 ppb, the components are not considered food additives. Since they are not considered food additives, a monolayer package wall containing the oxygen scavenging composition of the present invention is appropriate for direct contact with the package contents and may be used in such an application without prior approval from the FDA.

Another embodiment of the present invention is improving barrier performance even further by applying a coating to the monolayer container of interest. This may be advantageous even when the container is a monolayer oxygen scavenging type since the coating may: a) improve the effectiveness of the scavenger by reducing the overall oxygen permeation rate and, thus, the amount of oxygen seen by the scavenger; b) provide a barrier to something other than oxygen (e.g. $CO_2$, UV radiation); c) allow use of resins which might otherwise be excluded from use in monolayer packaging (e.g. blending of non-food contact approved recycled PET with a scavenger in combination with an internal coating); d) shield the scavenger from excessive capacity depletion prior to use, and/or e) correct some other deficiency which is addressed by use in combination with a scavenger.

Coatings of various forms are envisioned which may be useful in combination with oxygen scavenging monolayer containers. The key is that the coating fits one of the described advantages above. Examples include both internal and/or external coatings. Those applied by plasma deposition (e.g. Actis™, Best PET™), dip or spray methods (e.g. PPG's Bairocade®), and overmolding (E.g. Blox). They include silica and alumina based, carbon, and polymeric (epoxy-amine) coatings. Coatings are generally applied to otherwise fully formed containers, but the applicants also envision application to precursor monolayer scavenger objects such as preforms (e.g. overmolding Blox and then blowing a bottle) or thermoforming sheets.

EXAMPLE I

Copolymer Preparation

The OS Concentrate referenced in this example was prepared in the manner as herein described. The PET resin (Shell 8416) was dried overnight at 150° C. in a desiccant oven (dewpoint <−40° C.). A Werner & Pfliederer ZSK-30 twin screw extruder was equipped with loss-in-weight pellet feeder blanketed with nitrogen. Attached to the downstream end of the extruder was a gear pump, nine-layer screen pack (20-20-40-40-60-80-100-150-20 mesh) with a mechanical screen changer, and a die. The hydroxyl-terminated polybutadiene (Elf Atochem RLM20) and cobalt octoate solution (Hulls Nuodex® D.M.R.) were premixed in a 12:1 ratio. This mixture was maintained in a viscous fluid vessel from which it was separately conveyed via a positive displacement pump to a vacuum suction port on the extruder line. Dried PET resin and PMDA and benzophenone concentrates were rear fed to the extruder via separate loss-in-weight feeders. PET was extruded at a feed rate of about 6.4 kilograms per hour affording a residence time of approximately 6 minutes while maintaining extruder temperature in the range of 250 to 270° C. The hydroxyl-terminated polybutadiene/cobalt solution was pumped to the extruder at a rate of 0.9 kilograms per hour. The PMDA concentrate (10% concentrate in PET) was added at 0.8 kilograms per hour and the benzophenone concentrate (1% concentrate in PET) was added at a rate of 80 grams pre hour. The final formulation being 10 wt % polybutadiene, 1 wt % PMDA, 1000 PPM Cobalt, 100 PPM benzophenone with the balance PET resin.

Volatile by-products generated by the process were removed through a vacuum port on the extruder using a vacuum pump equipped with at dry ice trap to condense the volatiles. The polymer extrudate was stranded at the die, quenched in a water bath, and chipped at a chopper.

Bottle Fabrication

The OS Concentrate was used for an injection molding trial. Predried Kosa 3303 PET resin was mixed with the oxygen scavenging copolymer to create blends containing 2.5, 5, and 10 wt % OS Concentrate. The following blends were injection molded:

TABLE 1

| Bottle ID | Blend |
| --- | --- |
| 7205A | 10% OS conc/3303 PET |
| 7205B | 5% OS conc/3303 PET |
| 7205C | 2.5% OS conc/3303 PET |
| 7205D | Control 3303 PET |

Injection Molding Conditions:

The blends were molded into a 33 g beer preform on an Arburg 320M injection molding press with a 35 mm general purpose screw with 120 gm polystyrene maximum shot size. The machine clamp tonnage was 750 kN. The tie bar spacing was 320 mm. The processing conditions were established to mold this preform under the mildest molding conditions that would produce an acceptable perform. A high stretch light weight perform design was used throughout the injection molding trial with a cold runner sprue setup. The injection molding conditions are provided in Table 2:

TABLE 2

| Bottle ID | 7205A | 7205B | 7205C | 7205D |
| --- | --- | --- | --- | --- |
| Total Cycle Time (sec) | 50.0 | 50.1 | 49.3 | 50.0 |
| Part weight (g) | 33.3 | 33.2 | 33.2 | 33.3 |
| Temp Settings (° C.) | | | | |
| Zones 1–5 | 275–276 | 275–279 | 273–276 | 275–276 |
| Back Pressure (bar) | 10 | 10 | 10 | 10 |
| Screw Speed (m/min) | 10.0 | 10.0 | 10.0 | 10.0 |
| Dosage (ccm) | 35.0 | 35.0 | 35.0 | 35.0 |
| Injection | | | | |
| - 1st flow (ccm/s) | 12.0 | 12.0 | 12.0 | 12.0 |
| - 2nd flow (ccm/s) | 10.0 | 10.0 | 10.0 | 10.0 |
| - 3rd flow (ccm/s) | 0 | 0 | 0 | 0 |
| Injection pressure (bar) | 375 | 375 | 375 | 375 |

TABLE 2-continued

| Bottle ID | 7205A | 7205B | 7205C | 7205D |
| --- | --- | --- | --- | --- |
| Injection Time (sec) | 2.49/2.47 | 2.50/2.46 | 2.5/2.5 | 2.49/2.51 |
| Dosage Time (sec) | 4.4/4.4 | 4.3/4.4 | 5.3/4.3 | 4.4/4.4 |

Blow Molding Conditions:

The preforms were blown into a 500 mL beer bottle mold using a Sidel Model 1047, SBO2/3 (2 blow molding stations and 3 ovens) machine. The blow molding process was optimized to blow mold a container with minimal stress whitening in the bottle sidewall.

Each set of preforms were blown under the same conditions. The preforms molded at the higher oxygen scavenging resin contents absorbed more heat during the reheating process. Therefore, their preform temperatures were higher and the base weights were heavier as shown in the table below. The blow molding conditions used are provided in Table 3:

TABLE 3

| Bottle ID | 7205 A, B, C, D |
| --- | --- |
| Speed (bph) | 1600 |
| Overall Oven Power | 100% |
| Oven Lamp Settings | |
| Zone 6 | |
| Zone 5 | 20 |
| Zone 4 | 20 |
| Zone 3 | 83 |
| Zone 2 | 83 |
| Zone 1 | 100 |
| Low Blow Position (°) | 37 |
| Pressure (bar) | 14 |
| High Blow Position (°) | 70 |
| Pressure (bar) | 38 |
| Mold Temp. (° F.) | 40 |
| Base Mold Temp. (° F.) | 40 |
| Preform Temperature (° C.)* | 104–110 |
| Neck Weight (g) | 15.4–15.8 |
| Panel Weight (g) | 9.7–10.4 |
| Base Weight (g) | 10.4–11.0 |

*The preform temperature was measured 30 mm above the support ledge just after the preform exits the ovens using an IR sensor.

Bottle Performance Testing

Test bottles were sealed by gluing a 3"×3"×⅛" brass plate, fitted with a rubber septum, to the crown of each test bottle. The glue was Dexter Hysol 608, 5 minute worklife epoxy. Water (10 mL) was added to each bottle to assure 100% RH in the headspace, and the bottles were purged with a 2% oxygen/98% nitrogen gas mixture. The headspace oxygen content was monitored periodically by withdrawing a gas aliquot (3 mL) from the bottle and analyzing its oxygen content using a MOCON HS750 oxygen analyzer. Changes with time in the headspace oxygen content of these test bottles are summarized in Table 4, below:

TABLE 4

| | Change from Initial Headspace Oxygen Content | | | |
| --- | --- | --- | --- | --- |
| Days on test | 7 | 14 | 21 | 28 |
| Bottle ID | | | | |
| 7205A1 | −0.12% | −0.12% | −0.13% | −0.20% |
| 7205A2 | −0.08% | −0.11% | −0.14% | −0.20% |
| 7205A3 | −0.05% | −0.10% | −0.13% | −0.16% |
| 7205B1 | −0.12% | −0.12% | −0.12% | −0.14% |

TABLE 4-continued

| Bottle ID | | | | |
|---|---|---|---|---|
| 7205B2 | −0.12% | −0.13% | −0.16% | −0.18% |
| 7205B3 | −0.03% | −0.08% | −0.09% | −0.11% |
| 7205C1 | −0.07% | −0.01% | −0.08% | −0.11% |
| 7205C2 | −0.07% | −0.04% | −0.07% | −0.10% |
| 7205C3 | −0.03% | −0.01% | −0.04% | −0.03% |
| 7205D1 | −0.05% | +0.04% | 0.03% | 0.04% |
| 7205D2 | −0.02% | +0.09% | 0.06% | 0.10% |
| 7205D3 | −0.01% | +0.05% | 0.06% | 0.10% |
| Average | | | | |
| 7205A | −0.08% | −0.11% | −0.13% | −0.19% |
| 7205B | −0.09% | −0.11% | −0.12% | −0.14% |
| 7205C | −0.06% | −0.02% | −0.06% | −0.08% |
| 7205D | −0.03% | +0.06% | 0.05% | 0.08% |

| | Change from Initial Headspace Oxygen Content | | | |
|---|---|---|---|---|
| Days on test | 42 | 56 | 70 | 92 |
| Bottle ID | | | | |
| 7205A1 | −0.25% | −0.34% | −0.37% | −0.31% |
| 7205A2 | −0.26% | −0.33% | −0.37% | −0.42% |
| 7205A3 | −0.25% | −0.32% | −0.34% | −0.36% |
| 7205B1 | −0.20% | −0.28% | −0.30% | −0.30% |
| 7205B2 | −0.28% | −0.34% | −0.39% | −0.40% |
| 7205B3 | −0.18% | −0.23% | −0.25% | −0.25% |
| 7205C1 | −0.14% | −0.17% | −0.14% | −0.05% |
| 7205C2 | −0.15% | −0.18% | −0.16% | −0.09% |
| 7205C3 | −0.05% | −0.06% | 0.00% | +0.11% |
| 7205D1 | 0.10% | 0.14% | 0.33% | 0.36% |
| 7205D2 | 0.13% | 0.18% | 0.28% | 0.41% |
| 7205D3 | 0.14% | 0.18% | 0.28% | 0.43% |
| Average | | | | |
| 7205A | −0.25% | −0.33% | −0.36% | −0.36% |
| 7205B | −0.22% | −0.28% | −0.31% | −0.32% |
| 7205C | −0.11% | −0.14% | −0.10% | −0.01% |
| 7205D | 0.12% | 0.17% | 0.30% | 0.40% |

| | Change from Initial Headspace Oxygen Content | | | |
|---|---|---|---|---|
| Days on test | 120 | 148 | 176 | 204 |
| Bottle ID | | | | |
| 7205A1 | −0.44% | −0.55% | −0.55% | −0.62% |
| 7205A2 | −0.45% | −0.53% | −0.54% | −0.60% |
| 7205A3 | −0.37% | −0.51% | −0.51% | −0.58% |
| 7205B1 | −0.28% | −0.33% | −0.23% | −0.18% |
| 7205B2 | −0.43% | −0.56% | −0.56% | −0.62% |
| 7205B3 | −0.21% | −0.20% | −0.09% | +0.01% |
| 7205C1 | +0.06% | 0.12% | 0.28% | 0.40% |
| 7205C2 | +0.01% | 0.05% | 0.20% | 0.33% |
| 7205C3 | 0.29% | 0.40% | 0.61% | 0.78% |
| 7205D1 | 0.53% | 0.64% | 0.83% | 0.98% |
| 7205D2 | 0.56% | 0.67% | 0.85% | 1.02% |
| 7205D3 | 0.58% | 0.70% | 0.88% | 1.05% |
| Average | | | | |
| 7205A | −0.42% | −0.53% | −0.53% | −0.60% |
| 7205B | −0.31% | −0.36% | −0.29% | −0.26% |
| 7205C | +0.12% | 0.19% | 0.36% | 0.50% |
| 7205D | 0.56% | 0.67% | 0.85% | 1.02% |

EXAMPLE II

Migration Studies

Migration studies were conducted in accordance with FDA protocols, on bottles containing various levels of the OS concentrate. The bottles were tested to determine potential for migration of various substances, including benzophenone, ethyl hexanoate, pyromellitic acid and cobalt using conditions representing hot fill, plus storage (F&DA Protocol C) with the food simulating solvents 10% ethanol and 3% acetic acid. The migration test solutions were analyzed by Gas Chromatograph/Mass Spectrometry (GC/MS), High Pressure Liquid Chromatography (HPLC) and Graphite Furnace Atomic Absorption Analysis (GFAAS) techniques after exposure times of 2, 24, 96 and 240 hours.

Experimental Procedures

All migration tests were conducted in triplicate by filling the bottles with 500 ml of food simulating solvent which had been pre-warmed to 66° C. The bottles were then sealed using B19 'Quickfit' ground glass stoppers and placed into an oven set at 66° C. for two hours. The glass stoppers were an exact fit and judged gas tight. After this time, the bottle contents were allowed to cool to 40° C. and the exposure continued for 10 days at 40° C. in an incubator with gentle agitation.

Three complete sets of bottles were set up for migration testing, one set for the 3% acetic acid tests, a second set containing 10% ethanol for the cobalt measurements and a third set containing 10% ethanol for measurement of the organics. Aliquots of 50 ml were removed for analysis of cobalt from each bottle for analysis at each timepoint. Aliquots of 25 ml were removed for analysis of the organics from each bottle for analysis at each timepoint. No correction was made to any of the results to take into account the volumes removed at each timepoint.

HPLC Analysis for Pyromellitic Acid

HPLC analytical conditions were optimized for measurement of pyromellitic acid, a possible degradation product in the OS Concentrate. The analysis was carried out by ion suppression using a reverse phase HPLC column and direct injection of the 10% ethanol test solutions. The limit of detection was established by spiking 10 day test solutions with accurately known levels of about 3.5 and 17 ppb of pyromellitic acid. The chromatography conditions shown in Table 5 were used:

TABLE 5

| | |
|---|---|
| Column | 250 × 4.6 mm Phenomenex Luna 5 μm particles |
| Injection | 150 μl |
| Mobile Phase | A: water acidified to pH 2.0 using $H_3PO_4$ |
| | B: acetonitrile |
| Gradient Program | 90% A', 10% B held for 5 min then programmed to 20% A, 80% B over 10 minutes held 3 minutes. |
| Flow Rate | 1.2 ml/min. |
| Detector | UV 250 nm. |
| Retention Time | 5.1 min. |

GC/MS Analysis for Ethyl Hexanoate and Benzophenone

A 20 ml aliquot was pipetted into a 40 ml vial and the Internal standard solution added (50 μl of a 10 μg/ml solution of ethyl heptanoate and d5-benzophenone in ethanol). Anhydrous sodium sulphate (2 g) was then dissolved in the solution which was then extracted with 10 ml of pentane. The upper layers were in each case removed by Pasteur pipette, and dried over anhydrous sodium sulphate. The extracts were transferred to a 10 ml Kuderna-Danish apparatus, 0.5 ml of n-heptane added, and the contents evaporated to about 0.5 ml. The concentrated extract was then injected for GC/MS/SIM analysis using conditions described below.

Calibration was achieved by use of external standards containing the same additions of internal standards. Ethyl heptanoate was used as an internal standard for the determination of ethyl hexanoate and d5-benzophenone used as an internal standard for the determination of benzophenone. To estimate the limits of detection and recoveries for ethyl hexanoate and benzophenone, the 10 day test solutions from all samples were fortified with about 3 ppb of each analyte, in triplicate, prior to analytical workup. The 10 day test solutions were also fortified at a concentration of about 12 ppb of each analyte as an additional check on the recovery.

The GC/MS conditions are shown in Table 6.

TABLE 6

| | |
|---|---|
| Column | 30 m × 0.25 mm HP5-MS |
| Oven | 70° C. hold 2 min, ramped to 120° C. @ 10° C./min ramped to 310° C. at 20° C./min, hold 5 min. |
| Detector | MS ions m/z |
| | 88, 99, 113 - ethyl hexanoate/heptanoate |
| | 182, 187 - benzophenone and $d_6$-benzophenone |
| Injection | Splitless 270° C., 1 μl. |
| Carrier Gas | He 10 psi. |

*The MS ions in bold were used for quantitative measurements.

Graphite Furnace Atomic Absorption Analysis (GFAAS) For Cobalt

Aliquots of 50 ml were transferred from the samples under test to 100 ml polyethylene bottles which had been pre-cleaned in 2M nitric acid. One drop of a 6M solution of hydrochloric acid was added to each for stabilization. Graphite furnace atomic absorption analysis (GFAAS) was used for determination of cobalt using the instrumental conditions shown in Tables 7 and 8.

TABLE 7

| | |
|---|---|
| Wavelength | 240.7 nm |
| Slit Width | 0.2 nm |
| Background Correction | D2 |
| Measurement | Peak area 5 sec |
| Sample Volume | 20 μl in triplicate |

TABLE 8

Furnace Conditions

| Step | Temp° C. | Ramp Time (Sec) | Hold Time (Sec) | Internal Flow |
|---|---|---|---|---|
| 1 | 120 | 10 | 10 | 250 |
| 2 | 1400 | 1 | 15 | 250 |
| 3 | 20 | 1 | 10 | 250 |
| 4 | 2500 | 0 | 5 | 0 |
| 5 | 2600 | 1 | 5 | 250 |

Sample peak areas were compared against external standards of 0, 5, 10, 20 and 50 ppb cobalt.

The 240 h test solutions were fortified in triplicate with 5 ppb cobalt to confirm this concentration as being an appropriate estimate of the LOD. In addition, 10 day solutions were independently fortified at a level of 20 ppb and distributed randomly throughout the samples to act as controls.

Results

HPLC Analysis for Pyromellitic Acid

No significant differences were observed in the HPLC traces obtained from all of the test solutions. Pyromellitic acid was not detected in any of the replicate test solutions at any of the timepoints. The limit of detection for pyromellitic acid was estimated to be 3.5 ppb from the calibration confidence limits according to Miller[1], see Table 11. This was confirmed by spiking the 10 day extracts with 3.5 ppb pyromellitic acid showing that this level would be readily detected. As the recoveries were variable and high in some cases for the solutions spiked at the limits of detection (LOD), solutions were also fortified at a higher level (17.3 ppb).

[1] J. C. Miller and J. N. Miller. Statistics for Analytical Chemistry Ellis Horwood 1986.

GC/MS Analysis for Ethyl Hexanoate and Benzophenone

Benzophenone and ethyl hexanoic acid were not detected in any of the test solutions at any of the timepoints. A small peak, equivalent to about 2–3 ppb, was seen at the same retention time as 4-tert-butylphenol in all test solutions and the 10% ethanol blank food simulating solvent. The size of this peak did not vary significantly between the sample migration test solutions or the blank. The calculated LOD's are given in Table 11.

GFAAS Analysis for Cobalt

Cobalt was not detected in any of the 3% acetic acid or 10% ethanol test solutions at any of the timepoints. The LOD for cobalt was estimated by repeat injections of a 7205 A test solution spiked with 5 ppb cobalt (to give a measurable signal). The following results were obtained:

10% ethanol—4.9, 4.7, 5.2, 4.9, 4.2, 4.6, 4.1, 4.9, 5.5, 4.1, 3.5, 5.0, 6.0, 4.8, 5.5, 5.4, 1.2 ppb mean=4.6±1.1, LOD=3× standard deviation (SD)=3.3 ppb.

3% acetic acid—6.8, 4.4, 5.8, 5.2, 5.0, 9.0, 6.8, 6.6, 5.1, 9.1, 8.9, 4.5, 7.6, 7.1, 6.7, 4.1, 2.5, 5.3,4.8, 3.7, 6.0, 4.6, 4.8 mean=5.8±1.7, LOD=3×SD=5.1 ppb.

The results that were obtained on fortifying the other 240 hour test solutions, in triplicate, with 5 ppb Cobalt are provided in Table 9.

TABLE 9

| | Instrument Reading (ppb) |
|---|---|
| 3% Acetic Acid | |
| 7205 B | 6, 4, 3 |
| 7205 D | 3, 4, 4 |
| 7394 A | 2, 7, 5 |
| 7394 B | 2, 2, 3 |
| 7394 D | 2, 4, 3 |
| 10% Ethanol | |
| 7205 B | 3, 6, 4 |
| 7205 D | 6, 9, 2 |
| 7394 A | 3, 4, 4 |
| 7394 B | 3, 3, 3 |
| 7394 D | <2, 6, 5 |

The unfortified test solutions all gave readings of ≦2 ppb and a clear difference was observed on fortification at the 5 ppb level.

The control samples, which were 10 day test solutions independently spiked at a level of 20 ppb, (undisclosed to the analyst) gave the following results in Table 10.

TABLE 10

| 10% Ethanol (ppb) | 3% Acetic Acid (ppb) |
|---|---|
| 1. 11 | 1. 18 |
| 2. 14 | 2. 14 |
| 3. 15 | 3. 17 |
| 4. 13 | 4. 11 |
| Mean = 13 ± 2 | 5. 19 |
| | 6. 16 |
| | Mean = 16 ± 3 |

Limits Of Detection And Quantitation

TABLE 11

Calculated LOD and LOQ Values

| Analyte | LOD (ppb) | LOQ (ppb) | LOD μg/in² | LOQ μg/in² |
|---|---|---|---|---|
| Ethylhexanoate | 2.6 | 8.6 | 0.020 | 0.068 |
| Benzophenone | 0.8 | 2.7 | 0.006 | 0.021 |
| Pyromellitic acid | 3.5 | 12 | 0.027 | 0.091 |
| (HPLC data) | | | | |
| Cobalt | | | | |

TABLE 11-continued

Calculated LOD and LOQ Values

| Analyte | LOD (ppb) | LOQ (ppb) | LOD µg/in² | LOQ µg/in² |
|---|---|---|---|---|
| (GFAAS Data) | | | | |
| 10% Ethanol | 3.3 | 11 | 0.026 | 0.086 |
| 3% Acetic Acid | 5.1 | 17 | 0.040 | 0.133 |

Except for cobalt (described above), all limits of detection were estimated from the calibration confidence limits according to Miller. The LOD is defined as the analyte concentration giving a signal of 3× the standard deviation of the blank. The limits of quantitation (LOQ's) were calculated by multiplying the LOD by a factor of 3.33, representing the analyte concentration giving a signal of 10× the standard deviation of the blank. The calculated LOD's are given in Table 11. The LOD's are also expressed in units of µg/in² calculated by multiplying the ppb value by 0.5 liters and dividing by the surface area (64 in²).

The example shows that benzophenone and ethyl hexanoate were not detected by GC/MS analysis in any of the 10% ethanol test solutions at any of the timepoints with reliable limits of detection estimated to be 3 ppb. Pyromellitic acid was not detected in any of the 10% ethanol solutions by HPLC with UV detection with a reliable LOD estimated to be 4 ppb. Cobalt was also not detected in any of the 10% ethanol or 3% acetic acid test solutions with a limit of detection estimated to be 5 ppb.

EXAMPLE III

OS Concentrate having 88% PET segments and 10% polybutadiene oligomer segments 1 wt % PMDA, 1000 PPM Cobalt and 100 PPM benzophenone was evaluated for direct blending applications on a Husky 6 cavity injection press using a Foremost II pellet feeder. The feeder was calibrated to achieve four different OS Concentrate levels—1, 2, 4, and 6%—and was sampled over the course of several shots to ensure that the feeder was delivering a consistent flow of material with each dose.

TABLE 12

| Work Req. | Oxygen Scavenger | Concentrate Level | Diluting Resin | Preforms/ Bottles |
|---|---|---|---|---|
| 8643A | OS Concentrate | 1% | PET (Shell 8416) | 96/50 |
| 8643B | OS Concentrate | 2% | PET | 96/50 |
| 8643C | OS Concentrate | 4% | PET | 500/50 |
| 8643D | OS Concentrate | 6% | PET | 500/50 |
| 8643E | OS Concentrate | 4% | PETI-10 (Kosa 3303) | 96/50 |

The preforms were blow molded on a Sidel SBO2/3 to produce 20 oz. bottles with even material distribution throughout the sidewall. Fifty samples were blow molded for each variable.

Injection Molding Conditions:

The 20 oz. preform was used throughout the injection molding trial. The samples were injection molded on a six-cavity Husky LX-160. Shell 8416 and KoSa 3303 were dried overnight. The Foremost II pellet feeder equipped with a nitrogen purge line at the feed hopper was calibrated to achieve the various OS concentrate levels. The feeder was cycled for several shots to ensure a consistent flow of material was delivered to each dose. All variables ran at the same conditions in accordance with Table 13.

TABLE 13

| Sample | 8643A | 8643B | 8643C | 8643D | 8643E |
|---|---|---|---|---|---|
| Diluting Resin | 8416 | 8416 | 8416 | 8416 | 3303 |
| Cycle Time (sec) | 22.45 | 22.45 | 22.45 | 22.45 | 22.45 |
| Part weight (g) | 23.5 | 23.5 | 23.5 | 23.5 | 23.5 |
| Temp Settings Zones 1–5 (° C.) | 271 | 271 | 271 | 271 | 271 |
| Back Pressure (psi) | 127 | 127 | 127 | 127 | 127 |
| Screw Speed | 75% | 75% | 75% | 75% | 75% |
| Fill Speed | | | | | |
| - 1$^{st}$ Speed at 20 mm | 33% | 33% | 33% | 33% | 33% |
| - 2$^{nd}$ Speed at 40 mm | 40% | 40% | 40% | 40% | 40% |
| - 3$^{rd}$ Speed at 60 mm | 40% | 40% | 40% | 40% | 40% |
| - 4$^{th}$ Speed at 70 mm | 42% | 42% | 42% | 42% | 42% |
| - 5$^{th}$ Speed at 85 mm | 45% | 45% | 45% | 45% | 45% |
| Injection pressure (psi) | 127 | 127 | 127 | 127 | 127 |
| Fill Time (sec) | 2.88 | 2.88 | 2.88 | 2.88 | 2.88 |
| Hold Time/pressure | | | | | |
| 1$^{st}$ position | | | | | |
| • | 3.5 | 3.5 | 3.5 | 3.5 | 3.5 |
| • | 60% | 60% | 60% | 60% | 60% |
| 2$^{nd}$ position | | | | | |
| • | 4.0 | 4.0 | 4.0 | 4.0 | 4.0 |
| • | 50% | 50% | 50% | 50% | 50% |
| 3$^{rd}$ position | | | | | |
| • | 1.0 | 1.0 | 1.0 | 1.0 | 1.0 |
| • | 20% | 20% | 20% | 20% | 20% |

Blow Molding Conditions:

The blow molding conditions shown in Table 14 were optimized for each sample to achieve consistent material distribution. Slight adjustments were made between each sample. The 3303 sample had higher base weights due to the higher stretch in the same preform design. A 3303 sample without OS Concentrate was included to eliminate any haze issues associated with moisture. There appeared to be no visual differences between the two samples.

TABLE 14

| Sample | 8643A | 8643B | 8643C | 8643D | 8643E | 8643E w/o OS Conc |
|---|---|---|---|---|---|---|
| Speed (bph) | 1900 | 1900 | 1900 | 1900 | 1900 | 1900 |
| Overall Oven Power | 62% | 62% | 62% | 62% | 62% | 65% |
| Oven Lamp Settings | | | | | | |
| Zone 5 | 50% | 50% | 50% | 45% | 50% | 50% |
| Zone 4 | 55% | 55% | 55% | 55% | 55% | 55% |

TABLE 14-continued

| Sample | 8643A | 8643B | 8643C | 8643D | 8643E | 8643E w/o OS Conc |
|---|---|---|---|---|---|---|
| Zone 3 | 50% | 50% | 50% | 50% | 35% | 35% |
| Zone 2 | 50% | 50% | 50% | 50% | 50% | 50% |
| Zone 1 | 75% | 75% | 75% | 78% | 67% | 67% |
| Low Blow Position (°) Pressure (bar) | 28/10 | 28/10 | 28/10 | 29/10 | 23/10 | 23/10 |
| High Blow Position (°) Pressure (bar) | 70/38 | 70/38 | 70/38 | 70/38 | 70/38 | 70/38 |
| Mold Temp. (° F.) | 40 | 40 | 40 | 40 | 40 | 40 |
| Base Mold Temp. (° F.) | 40 | 40 | 40 | 40 | 40 | 40 |
| Preform Temp. (° C.)* | 108 | 113 | 113 | 113 | 100 | 100 |
| Neck Weight (g) | 9.6 | 9.6 | 9.6 | 9.6 | 9.3 | 9.3 |
| Panel Weight (g) | 8.8 | 8.9 | 8.9 | 9.0 | 7.9 | 7.8 |
| Base Weight (g) | 5.3 | 5.2 | 5.1 | 5.1 | 6.4 | 6.7 |

*The preform temperature was measured 30 mm above the support ledge just after the preform exits the ovens using an IR sensor.

Haze values were measured on a Hunter Lab Ultra Scan Sphere and calculated as follows:

$$\text{Haze} = \frac{Y \text{ Diffuse Transmission}}{Y \text{ Total Transmission}} \times 100$$

| Sample # | % DFC | Haze |
|---|---|---|
| 8643A | 1% DFC | 1.4% |
| 8643B | 2% DFC | 2.9% |
| 8643C | 4% DFC | 5.7% (diluted with PET) |
| 8643E | 4% DFC | 3.4% (diluted with PET1-10) |
| 8643D | 6% DFC | 8.4% |

EXAMPLE IV

Taste Test

A triangular taste test was conducted by a third party institute to study the impact of Applicants' monolayer packages on the taste of beer. Half liter plastic monolayer bottles containing 10 wt % OS Concentrate in PET were manufactured using standard injection blow molding equipment. The monolayer bottles were cut into 3"×¾" strips and one strip was placed in each of several glass bottles of beer and recapped. The beer was then tested in a triangular taste test at specific time intervals in comparison to a control glass bottle of beer that has been opened and recapped with no strip added.

The triangular taste test of this example used 16 trained tasters. Each taster was given three sample cups of beer. One was the control, one was the test and the third was either the control or the test. The taster was asked to choose which beer was different. If the taster correctly identified the odd sample then the plastic strip is judged to have impacted the taste of beer. If the taster incorrectly identified the odd sample then the plastic strip was judged to have no impact on the taste. These results are tallied and in this type of study if nine of sixteen tasters correctly identify the odd sample the plastic is judged to have impacted the taste at the 95% confidence level.

The triangular taste test intervals were 7, 30, 60 90 and 120 days. In addition, an abuse test (3 days at 60° C.) was conducted to forecast longer term room temperature results.

The results were as follows:

| Interval | Correct Ids | Significant Difference? |
|---|---|---|
| 7 days | 5 of 16 | nsd |
| 30 days | 9 of 16 | 0.05 |
| 60 days | 6 of 16 | nsd |
| 90 days | 8 of 16 | nsd |
| 120 days | 7 of 16 | nsd |
| Abused | 6 of 16 | nsd | nsd = no significant difference
0.05 = a significant difference at the 95% confidence level The test demonstrates that a difference was detected at only one interval and at the west significant level since only 9 of 16 tasters correctly selected the odd sample. The overall conclusion by the third party conducting the study was that Applicants' monolayer package did not cause any detectable differences in the taste of the beer.

We claim:

1. A monolayer polyester package for oxygen sensitive products comprised of an oxygen scavenging composition wherein the oxygen scavenging composition is comprised of a modified copolymer and a transition metal catalyst, and wherein the monolayer package is appropriate for direct contact with the oxygen sensitive products and has a haze value less than about 8%.

2. The monolayer package of claim 1 further comprising a polyester packaging material appropriate for direct contact with the oxygen sensitive products.

3. The monolayer package of claim 2 wherein the polyester packaging material is PET or PEN.

4. The monolayer package of claim 1 wherein the modified copolymer is comprised of predominantly polycondensate segments and a lesser weight percent of oxygen scavenging moiety segments.

5. The monolayer package of claim 4 wherein the modified copolymer contains from about 0.05 wt % to about 20 wt % oxygen scavenging moiety segments.

6. The monolayer package of claim 5 wherein the oxygen scavenging moiety segments are comprised of polyolefin oligomers having a molecular weight in the range of 100 to 10,000.

7. The monolayer package of claim 6 wherein the oxygen scavenging moiety segments are comprised of unhydrogenated polybutadiene having a molecular weight in the range of 1,000 to 3,000.

8. The monolayer package of claim 4 wherein the polycondensate segments are comprised of PET or PET copolymer.

9. The monolayer package of claim 1 wherein the migration level of the components of oxygen scavenging composition from the package to the oxygen sensitive products is less than 50 ppb.

10. The monolayer package of claim 1 further comprising a coating.

11. The monolayer package of claim 1 wherein the monolayer package is suitable for recycle with conventional polyester bottles.

12. A monolayer package for oxygen sensitive products comprised of a polyester packaging material and an oxygen scavenging composition, wherein the oxygen scavenging composition is comprised of a modified copolymer and a transition metal catalyst wherein the migration level of the components of the oxygen scavenging composition front the package to the oxygen sensitive products is less than 50 ppb.

13. The monolayer package of claim 12 wherein the modified copolymer is comprised of about 80–99.95 wt % PET segments and about 0.05 wt % to 20 wt % unhydrogenated polybutadiene segments.

14. The monolayer package of claim 12 further comprising a coating.

15. The monolayer package of claim 12 wherein the monolayer package is suitable for recycle with conventional polyester bottles.

16. The monolayer package of claim 12 wherein the monolayer package has a haze value less than about 8%.

17. The monolayer package of claim 1 or 12 comprising 0.02 to 10 wt % modified copolymer and 90 to 99.8 wt % unmodified polyester.

18. A monolayer package for oxygen sensitive products comprised of a polyester packaging material and an oxygen scavenging composition, wherein the oxygen scavenging composition is comprised of a modified copolymer and a transition metal catalyst, wherein the modified copolymer is comprised of 5 to 10 wt % unhydrogenated polybutadiene segments and 90 to 95 wt % polycondensate segments wherein the migration level of the components of the oxygen scavenging composition from the package to the oxygen sensitive products is less than 50 ppb, and wherein the monolayer package has a haze value less than about 3%.

19. A monolayer package for oxygen sensitive products comprised of an oxygen scavenging composition wherein the oxygen scavenging composition is comprised of a modified copolymer and a transition metal catalyst, and wherein the monolayer package is appropriate for direct contact with a food or beverage.

20. The monolayer package of claim 19 further comprising a plastic packaging material appropriate for direct contact with the oxygen sensitive products.

21. The monolayer package of claim 20 wherein the plastic packaging material is PET or PEN.

22. The monolayer package of claim 19 wherein the modified copolymer is comprised of predominantly polycondensate segments and a lesser weight percent of oxygen scavenging moiety segments.

23. The monolayer package of claim 22 wherein the modified copolymer contains from about 0.05 wt % to about 20 wt % oxygen scavenging moiety segments.

24. The monolayer package of claim 23 wherein the oxygen scavenging moiety segments are comprised of polyolefin oligomers having a molecular weight in the range of 100 to 10,000.

25. The monolayer package of claim 24 wherein the oxygen scavenging moiety segments are comprised of unhydrogenated polybutadiene having a molecular weight in the range of 1,000 to 3,000.

26. The monolayer package of claim 22 wherein the polycondensate segments are comprised of PET or PET copolymer.

27. The monolayer package of claim 19 wherein the migration level of the components of oxygen scavenging composition from the package to the food or beverage is less than 50 ppb.

28. The monolayer package of claim 19 further comprising a coating.

29. The monolayer package of claim 19 wherein the monolayer package is suitable for recycle with conventional polyester bottles.

30. The monolayer package of claim 19 wherein the monolayer package has a haze value less than about 8%.

31. A monolayer package for oxygen sensitive products comprised of a polyester packaging material and an oxygen scavenging composition, wherein the oxygen scavenging composition is comprised of a modified copolymer and a transition metal catalyst wherein the migration level of the components of the oxygen scavenging composition from the package to the food or beverage is less than 50 ppb.

32. The monolayer package of claim 31 wherein the modified copolymer is comprised of about 80–99.95 wt % PET segments and about 0.05 wt % to 20 wt % unhydrogenated polybutadiene segments.

33. The monolayer package of claim 31 further comprising a coating.

34. The monolayer package of claim 31 wherein the monolayer package is suitable for recycle with conventional polyester bottles.

35. The monolayer package of claim 31 wherein the monolayer package has a haze value less than about 8%.

36. The monolayer package of claim 19 or 31 comprising 0.02 to 10 wt % modified copolymer and 90 to 99.8 wt % unmodified polyester.

37. A monolayer package appropriate for direct contact with a food or beverage comprised of a polyester packaging material and an oxygen scavenging composition, wherein the oxygen scavenging composition is comprised of a modified copolymer and a transition metal catalyst, wherein the modified copolymer is comprised of 5 to 10 wt % unhydrogenated polybutadiene segments and 90 to 95 wt % polycondensate segments wherein the migration level of the components of the oxygen scavenging composition from the package to the oxygen sensitive products is less than 50 ppb, and wherein the monolayer package has a haze value less than about 5%.

* * * * *